United States Patent
Jenks et al.

(10) Patent No.: US 12,244,875 B2
(45) Date of Patent: Mar. 4, 2025

(54) ASSERTING AND ESTABLISHING PROVENANCE OF MEDIA CONTENT DURING LIVE STREAMING

(71) Applicant: Microsoft Technology Licensing, LLC, Redmond, WA (US)

(72) Inventors: Andrew Jenks, Woodinville, WA (US); Samuel J. Wenker, Kirkland, WA (US); Kevin M. Kane, Redmond, WA (US); Paul England, Bellevue, WA (US); Ning Lin, Bellevue, WA (US); John C. Simmons, North Bend, WA (US); Quintin Burns, Charlotte, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/211,159

(22) Filed: Jun. 16, 2023

(65) Prior Publication Data
US 2024/0314367 A1    Sep. 19, 2024

Related U.S. Application Data

(60) Provisional application No. 63/452,271, filed on Mar. 15, 2023.

(51) Int. Cl.
*H04N 21/2187* (2011.01)
(52) U.S. Cl.
CPC .............................. *H04N 21/2187* (2013.01)
(58) Field of Classification Search
None
See application file for complete search history.

(56) References Cited

U.S. PATENT DOCUMENTS

2005/0278531 A1* 12/2005 England ................. G06F 21/54
      713/168
2013/0291082 A1* 10/2013 Giladi ..................... H04L 63/08
      726/7

(Continued)

OTHER PUBLICATIONS

Coalition for Content Provenance and Authenticity (C2PA), "C2PA Explainer," Release 1.2, downloaded from World Wide Web, 6 pp. (2023).

(Continued)

*Primary Examiner* — Alexander Q Huerta
(74) *Attorney, Agent, or Firm* — Klarquist Sparkman, LLP

(57) ABSTRACT

Lightweight mechanisms provide a way to assert provenance when live streaming media content and establish provenance upon playback. For example, a provenance claim generator generates a key pair including a live-stream private key and live-stream public key. The claim generator signs, with a long-term private key reliably associated with a sender, manifest metadata including the live-stream public key, thereby producing a manifest signature. During live streaming, the claim generator signs respective portions of media content with the live-stream private key, producing portion signatures for the respective portions. A provenance claim validator receives the manifest signature and manifest metadata. The claim validator verifies the manifest metadata using a long-term public key (reliably associated with the sender) and the manifest signature. During live streaming, the claim validator verifies the respective portions of the media content using the live-stream public key and the portion signatures for the respective portions.

20 Claims, 7 Drawing Sheets

(56) References Cited

U.S. PATENT DOCUMENTS

| | | | | |
|---|---|---|---|---|
| 2014/0096271 A1* | 4/2014 | Wang | .................... | G06F 21/44 726/30 |
| 2015/0195256 A1* | 7/2015 | Swaminathan | ....... | H04L 63/045 713/171 |
| 2020/0374130 A1* | 11/2020 | Strong | .................... | H04L 9/006 |
| 2024/0276075 A1* | 8/2024 | Miller | ................ | H04N 21/8358 |

OTHER PUBLICATIONS

Coalition for Content Provenance and Authenticity (C2PA), "C2PA Harms Modelling," Release 1.0, downloaded from World Wide Web, 17 pp. (Mar. 2023).

Coalition for Content Provenance and Authenticity (C2PA), "C2PA Implementation Guidance," Release 1.2, downloaded from World Wide Web, 25 pp. (2023).

Coalition for Content Provenance and Authenticity (C2PA), "C2PA Security Considerations," Release 1.0, downloaded from World Wide Web, 18 pp. (Mar. 2023).

Coalition for Content Provenance and Authenticity (C2PA), "C2PA Technical Specification," Release 1.2, downloaded from World Wide Web, 171 pp. (2023).

Coalition for Content Provenance and Authenticity (C2PA), "C2PA Technical Specification," Release 1.3, downloaded from World Wide Web, 213 pp. (2023).

Coalition for Content Provenance and Authenticity (C2PA), "C2PA User Experience Guidance for Implementers," Release 1.1, downloaded from World Wide Web, 33 pp. (2023).

Turan et al., "Status Report on the Second Round of the NIST Lightweight Cryptography Standardization Process," NISTIR 8369, 92 pp. (Jul. 2021).

Wikipedia, "Group of Pictures," downloaded from World Wide Web, 2 pp. (Oct. 2021).

England et al., "AMP: Authentication of Media via Provenance," Proc. ACM SIGPLAN Int'l Conf. on Programming Language and Design Implementation, pp. 108-121 (Jul. 2021).

International Search Report and Written Opinion dated Jun. 28, 2024, from International Patent Application No. PCT/US2024/ 018584, 10 pp.

* cited by examiner software 180 implementing one or more innovations for asserting and establishing provenance of media content during live streaming

300 example object 501 with manifest metadata example object 502 with portion signature

ASSERTING AND ESTABLISHING PROVENANCE OF MEDIA CONTENT DURING LIVE STREAMING

RELATED APPLICATIONS

This application claims the benefit of U.S. Provisional Pat. App. No. 63/452,271, filed Mar. 15, 2023, the disclosure of which is hereby incorporated by reference.

BACKGROUND

When a sender transmits media content over a computer network, a malicious actor (sometimes called a "man in the middle") can intercept the media content, tamper with the media content, and impersonate the sender of the media content. To prevent such impersonation, the sender can transmit metadata that allows a receiver to establish the provenance of the media content (that is, establish that the sender indeed transmitted the media content).

Existing approaches to sending and using metadata to establish the provenance of media content can work for media downloaded as a file, when all of the file is available to be processed to assert provenance before any of the media content is transmitted. Such approaches do not work for live streaming of media content, however, when transmission of the media content starts while the media content is still being generated.

SUMMARY

In summary, the detailed description presents innovations in asserting and establishing provenance of media content during live streaming. The innovations can provide a lightweight way to assert provenance when live streaming media content and to establish provenance upon playback. The innovations include the features covered by the claims.

According to a first aspect of techniques and tools described herein, a provenance claim generator performs operations to assert provenance of media content during live streaming. The provenance claim generator determines (e.g., generates or requests/receives from a key generator) a key pair including a live-stream private key and a live-stream public key. The provenance claim generator can also set an indicator of a validity period for the live-stream private/public keys. Alternatively, the validity period can be implied by other information, e.g., information that designates a session as being a live-streaming session or designates a stream as being a live stream. The provenance claim generator signs, with a long-term key that is reliably associated with a sender, manifest metadata including the live-stream public key, thereby producing a manifest signature. If the provenance claim generator sets an indicator of a validity period for the live-stream private/public keys, the manifest metadata can also include the indicator of the validity period. The provenance claim generator outputs, as part of a bitstream, the manifest metadata and the manifest signature.

During live streaming of media content, the provenance claim generator signs portions of the media content. In particular, for each of multiple portions of media content during live streaming of the media content, the provenance claim generator signs (with the live-stream private key) the portion of media content, thereby producing a portion signature, and outputs the portion signature as part of the bit stream. The portion signature provides a provenance claim for the portion of the media content.

In some example implementations, an asset is a file or stream of data containing digital content, asset metadata and optionally, a manifest, where the file can be cloud native and dynamically generated data. An assertion is a data structure which represents a statement asserted by an actor (e.g., organization, group, or other entity, or equipment or service thereof) concerning an asset. The assertion is a part of a manifest, which is a set of information about the provenance of an asset. With the approaches described herein, a provenance claim generator uses an indirect hard binding assertion. With the portion signatures, the provenance claim generator asserts provenance in a way that is bound to the actual portions of the media content. The assertion is indirect, however. The long-term key associated with the sender does not directly sign the portions of the media content. Instead, the long-term key signs the live-stream public key, which is then used to sign the portions of the media content.

In some example implementations, the portions of the media content are signed at multiple different temporal hierarchy levels (e.g., at chunk level, at fragment level, at segment level, and/or at segment group level). In this way, the provenance claim generator enables, at playback, selection of a point of balance between provenance latency (latency added to establish provenance) and playback performance (the overhead cost of establishing provenance). For example, provenance can be validated in a fine-grained way (e.g., for half-second chunks of media content), such that provenance can be validated quickly but the operations to check provenance incur more overhead. Or, provenance can be validated in a coarse-grained way (e.g., for 20 second segments of media content), such that operations to check provenance incur less overhead but the delay to validate provenance is longer.

According to a second aspect of techniques and tools described herein, a provenance claim validator performs operations to establish provenance of media content during live streaming. The provenance claim validator receives, as part of a bitstream, a manifest signature and manifest metadata. The manifest metadata includes a live-stream public key. The manifest metadata can also include an indicator of a validity period for the live-stream public key. Alternatively, the validity period can be implied by other information, e.g., information that designates a session as being a live-streaming session or designates a stream as being a live stream. The provenance claim validator verifies, with a long-term key (reliably associated with the sender) and the manifest signature, the manifest metadata.

During live streaming of media content, the provenance claim validator verifies portions of the media content. In particular, for each of multiple portions of media content during live streaming of the media content, the provenance claim validator receives, as part of the bitstream, a portion signature for the portion of the media content and verifies (with the live-stream public key and the portion signature) the portion of the media content. In this way, the provenance claim validator validates a provenance claim for the portion of the media content.

In some example implementations, the portions of the media content are signed at multiple different temporal hierarchy levels (e.g., at chunk level, at fragment level, at segment level, and/or at segment group level). In this case, the provenance claim validator can select, for playback, a point of balance between provenance latency (latency added to establish provenance) and playback performance (the overhead cost of establishing provenance).

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

DETAILED DESCRIPTION

The detailed description presents innovations in asserting and establishing provenance of media content during live streaming. The innovations can provide a lightweight way to assert provenance when live streaming media content and to establish provenance upon playback.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems

Figure 1:
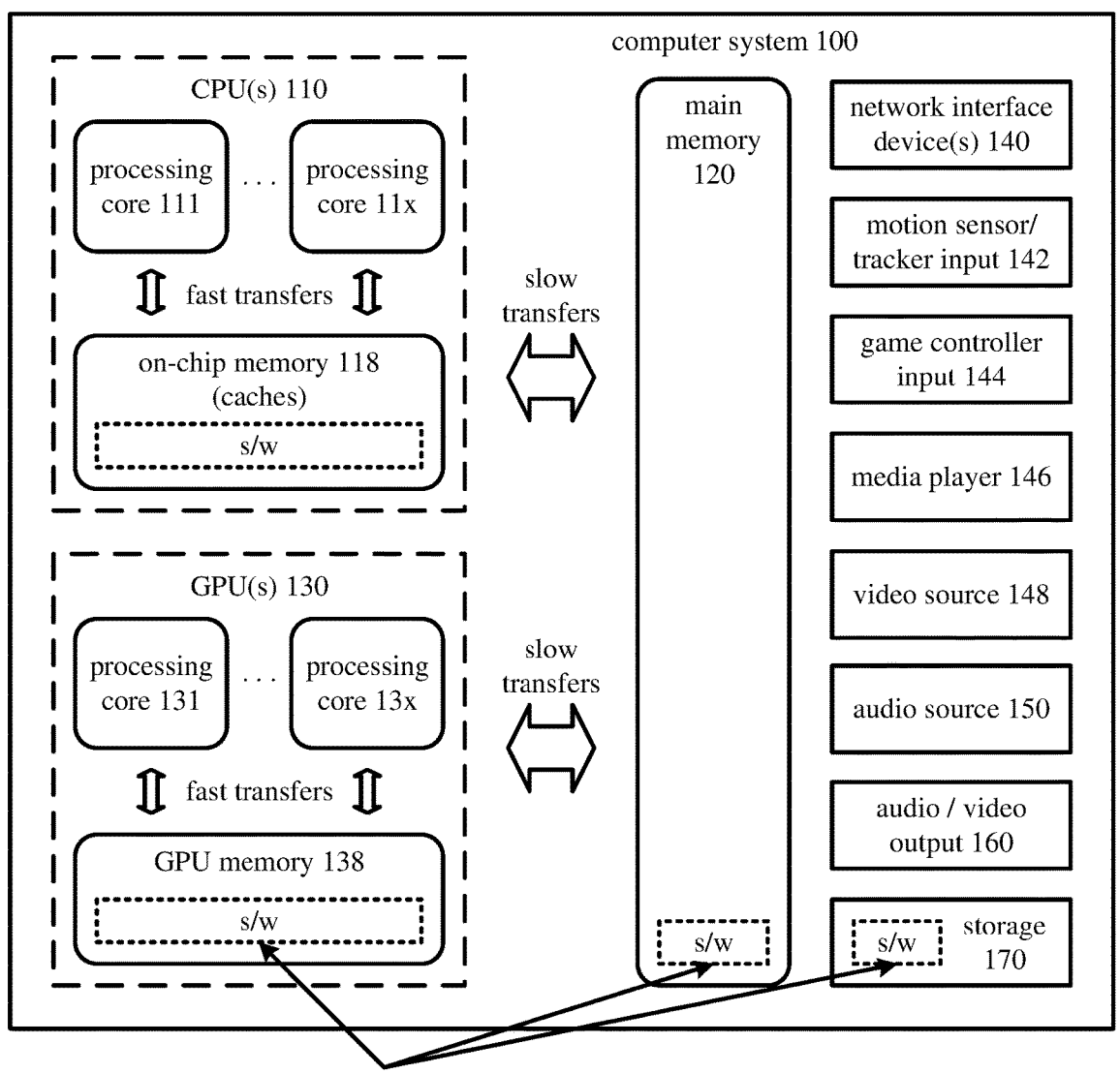
FIG. 1 is a diagram illustrating an example computer system in which some described embodiments can be implemented.

FIG. 1 illustrates a generalized example of a suitable computer system (100) in which several of the described innovations may be implemented. The innovations described herein relate to asserting and establishing provenance of media content during live streaming. The computer system (100) is not intended to suggest any limitation as to scope of use or functionality, as the innovations may be implemented in diverse computer systems, including special-purpose computer systems.

With reference to FIG. 1, the computer system (100) includes one or more processing cores (110 . . . 11x) and local memory (118) of a central processing unit ("CPU") or multiple CPUs. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (110 . . . 11x). Alternatively, the processing cores (110 . . . 11x) can be part of a system-on-a-chip ("SoC"), application-specific integrated circuit ("ASIC"), or other integrated circuit.

The local memory (118) can store software (180) implementing aspects of the innovations for asserting and establishing provenance of media content during live streaming, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) also includes processing cores (130 . . . 13x) and local memory (138) of a graphics processing unit ("GPU") or multiple GPUs. The number of processing cores (130 . . . 13x) of the GPU depends on implementation. The processing cores (130 . . . 13x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (138) may be volatile memory (e.g., registers, cache, RAM), non-volatile memory (e.g., ROM, EEPROM, flash memory), or some combination of the two, accessible by the respective processing cores (130 . . . 13x). The GPU memory (138) can store software (180) implementing aspects of the innovations for asserting and establishing provenance of media content during live streaming, for operations performed by the respective processing cores (130 . . . 13x), in the form of computer-executable instructions such as shader code.

The computer system (100) includes main memory (120), which may be volatile memory (e.g., RAM), non-volatile memory (e.g., ROM, EEPROM, flash memory), or some combination of the two, accessible by the processing core(s) (110 ... 11x, 130 ... 13x). The main memory (120) stores software (180) implementing aspects of the innovations for asserting and establishing provenance of media content during live streaming, in the form of computer-executable instructions. In FIG. 1, the main memory (120) is off-chip memory, for which access operations, transfer operations, etc. with the processing cores (110 ... 11x, 130 ... 13x) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processing system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi® transceivers, an Ethernet® port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (100) optionally includes a motion sensor/tracker input (142) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

The computer system (100) optionally includes a game controller input (144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (146) and video source (148). The media player (146) can play DVDs, Blu-ray™ discs, other disc media and/or other formats of media. The video source (148) can be a camera input that accepts video input in analog or digital form from a video camera, which captures natural video. Or, the video source (148) can be a screen capture module (e.g., a driver of an operating system, or software that interfaces with an operating system) that provides screen capture content as input. Or, the video source (148) can be a graphics engine that provides texture data for graphics in a computer-represented environment. Or, the video source (148) can be a video card, TV tuner card, or other video input that accepts input video in analog or digital form (e.g., from a cable input, High-Definition Multimedia Interface ("HDMI") input or other input).

An optional audio source (150) accepts audio input in analog or digital form from a microphone, which captures audio, or other audio input.

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing aspects of the innovations for asserting and establishing provenance of media content during live streaming.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Network Environments

Figure 2:
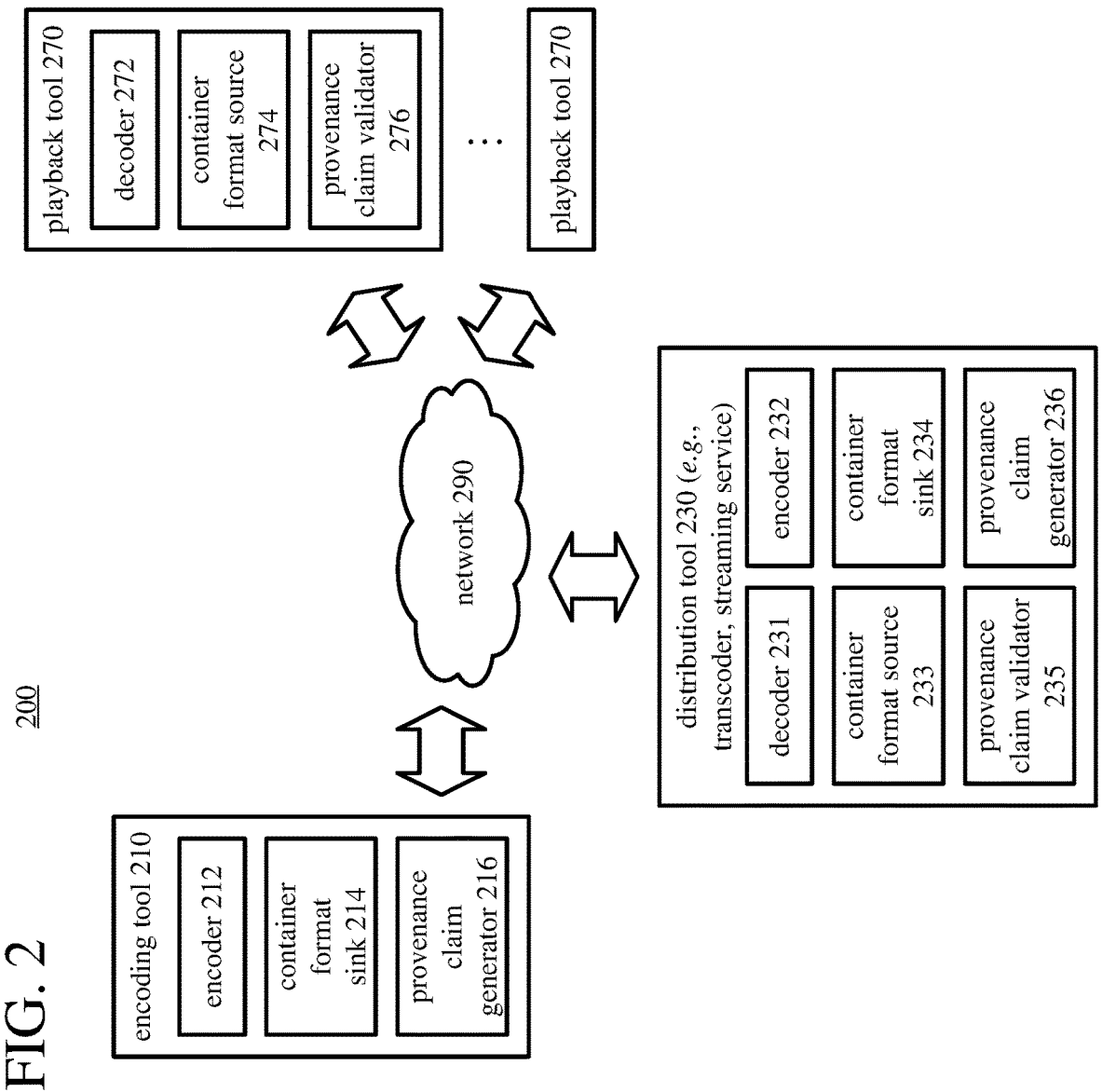
FIG. 2 is a diagram of an example network environment in which some described embodiments can be implemented.

FIG. 2 shows an example network environment (200) that includes an encoding tool (210), a distribution tool (230), and multiple playback tools (270). The various tools connect over a network (290) such as the Internet or another computer network.

The encoding tool (210) includes a media encoder (212), container format sink (214), and provenance claim generator (216). The encoder tool (210) manages encoding by the media encoder (212). The media encoder (212) receives media content and encodes the media content to produce encoded media content compliant with a standardized format or proprietary format. The media encoder (212) can be a video encoder, audio encoder, or other type of media encoder. The container format sink (214) receives encoded media content (325) and organizes the encoded media content (325) in a media container (335) according to a container format such as ISO/IEC 14496-12, ASF, WebM or another container format. The provenance claim generator (216) performs operations to assert provenance of portions of the encoded media content, as described below. Although the provenance claim generator (216) is shown separately, the provenance claim generator (216) can be incorporated in the media encoder (212) or container format sink (214). The encoding tool (210) can also include server-side controller logic for managing connections with one or more playback tools (270).

Each of the playback tools (270) includes a media decoder (272), container format source (274), and provenance claim validator (276). A playback tool (270) manages decoding by the media decoder (272). The media decoder (272) receives encoded media content compliant with a standardized format or proprietary format and decodes the media content to produce reconstructed media content. The media decoder (272) can be a video decoder, audio decoder, or other type of media decoder. The container format source (274) receives and processes the media container. The container format source (274) removes the encoded media content that is organized in the media container according to a container format such as ISO/IEC 14496-12, ASF, WebM or another container format. The provenance claim validator (276) performs operations to establish provenance of portions of the encoded media content, as described below. Although the provenance claim validator (276) is shown separately, the provenance claim generator (216) can be incorporated in the media decoder (272) or container format source (274). A playback tool (210) can also include client-side controller logic for managing connections with the encoding tool (210) or distribution tool (230).

The encoding tool (210) can directly provide encoded media content in a media container to a playback tool (270). Or, the encoding tool (210) can provide the encoded media content in a media container to the distribution tool (230), which can process the encoded media content and provide the encoded media content, or a different version of the encoded media content, to a playback tool (270). The distribution tool (230) is, for example, a streaming service or transcoder.

In FIG. 2, the distribution tool (230) includes a media decoder (231), container source (233), provenance claim validator (235). media encoder (232), container sink (234), and provenance claim generator (236). The distribution tool (230) can transcode the encoded media content into a different codec format or bitrate using the decoder (231) and encoder (232). Or, the distribution tool (230) can create multiple versions of the encoded media content, e.g., at different bitrates for streaming to different playback tools. The distribution tool (230) can also repackage encoded media content into a different container format using the container format source (233) and container format sink (234), with or without transcoding. Whether or not the encoded media content is transcoded, re-packaged, or otherwise modified by the distribution tool (230), the distribution tool (230) can establish provenance of the original sender—the encoding tool (210)—using the provenance claim validator (235) and re-assert provenance of the media content using the provenance claim generator (236). In doing so, the distribution tool (230) asserts that it is the sender of the media content.

FIG. 2 illustrates a streaming scenario. In the network environment (200), the encoding tool (210) encodes media content for delivery to multiple playback tools (270). The unidirectional communication can be provided for a broadcast, a video surveillance system, web camera monitoring system, a remote desktop conferencing presentation or other scenario in which media content is encoded and sent from one location to one or more other locations. Although the network environment (200) includes two playback tools (270), the network environment (200) can include more or fewer playback tools (270). In general, a playback tool (270) communicates with the encoding tool (210) or distribution tool (230) to determine a stream of media content for the playback tool (270) to receive. The playback tool (270) receives the stream, buffers the received encoded data for an appropriate period, and begins decoding and playback.

Alternatively, the approaches described herein can be used for real-time communication or low-latency bidirectional communication. The bidirectional communication can be part of a video conference, video telephone call, or other two-party communication scenario. For example, in such scenarios, each end point includes both an encoding tool (210) and a playback tool (270).

III. Asserting and Establishing Provenance of Media Content During Live Streaming This section describes innovations in asserting and establishing provenance of media content during live streaming. The innovations can provide a lightweight way to assert provenance when live streaming media content and to establish provenance upon playback.

When a sender transmits encoded video content over a computer network, a malicious actor (sometimes called a "man in the middle") can intercept the encoded video content, tamper with the video content, and impersonate the sender of the video content. To prevent such impersonation, the sender can transmit metadata that allows a receiver to establish the provenance of the encoded video content (that is, establish that the sender indeed transmitted the encoded video content, and that the video content has not been modified subsequently).

In one prior approach to sending and using metadata to establish the provenance of encoded video content, a content provider signs the encoded video content of a stream available for download by video on demand ("VOD"). In this approach, the content provider must have all video content of the stream at the time of signing. The content provider uses a Merkle tree in which every leaf node is labelled with the hash of a block of encoded video data such as a chunk. In the Merkle tree, each non-leaf node is labelled with the hash of the labels of its child nodes. This process continues up to the root node of the Merkle tree, which is effectively hashed over the entire stream.

After the Merkle tree is generated, the Merkle tree provides a way for efficient and secure verification of content anywhere in the Merkle tree. The Merkle tree cannot be used, however, until all of the encoded video content is available. For this reason, the verification approach using the Merkle tree is not practical for live streaming scenarios.

Making provenance information available and self-contained for a window of time is an option, but there are complications. In the prior VOD approach, a metadata box in an initialization segment contains a signed manifest for an entire stream. Since the signed manifest includes a signature associated with the root node of the Merkle tree, the provenance associated with the signature extends to all metadata boxes in the stream, which is a benefit. Making provenance information self-contained to a window of time loses the benefit of global protection from the signed manifest for the entire stream. On the other hand, including a signed manifest in every metadata box, for every chunk for narrow windows of time, could involve extensive operations for signing and verification of signatures, which is impractical for long-term secure keys typically used to assert provenance. (In particular, signing operations are typically time-consuming for a long-term key, since the long-term key is usually kept in a highly secure environment. In contrast, verification operations, e.g., using a public key, tend to be faster.)

In example implementations that use technology from the Coalition for Content Provenance and Authenticity ("C2PA"), an asset is a file or stream of data containing digital content, asset metadata and optionally, a manifest, where the file can be cloud native and dynamically generated data. An assertion is a data structure which represents a statement asserted by an actor (e.g., organization, group, or other entity, or equipment or service thereof) concerning an asset. The assertion is a part of a manifest, which is a set of information about the provenance of an asset. For additional details about C2PA technology, see, e.g., the "C2PA Technical Specification," release 1.2 (Nov. 2, 2022) and the "C2PA Technical Specification," release 1.3 (Apr. 3, 2023).

This section describes hybrid solutions. In contrast to prior solutions in which a provenance claim generator uses a "direct" binding in a hard binding assertion in a manifest for a stream (by signing, with a long-term secure key, a hash value derived from encoded media content for the entire stream), in the hybrid solutions a provenance claim generator uses an "indirect" hard binding assertion in a stream manifest. The provenance claim generator determines (e.g., generates) a live-stream key pair including a live-stream private key and a live-stream public key. Typically, the live-stream key pair is short-lived, having a validity period of hours or some other short duration. The provenance claim generator signs, with the long-term secure key, a stream manifest that includes the live-stream public key. The stream manifest can also include an indicator of the validity period, or the validity period can be implied by other information (e.g., information that designates a session as being a live-streaming session or designates a stream as being a live stream).

The provenance claim generator uses the live-stream private key to sign hash values derived from portions of encoded media content. In particular, a portion of the encoded media content is hashed (e.g., using alg & exclusions[ ] fields of a data structure that describes a content binding, or hashed in any other way), and then signed using the live-stream private key. Other data such as timestamp or sequence number can be hashed along with the portion of the encoded media content, with the resulting hash value being signed by the live-stream private key. In this way, portions of the encoded media content are asymmetrically signed— the live-stream private key is used for signing, but the live-stream public key is used for verification.

The resulting portion signature (also called a live stream signature) is placed in a metadata box having type information that specifies the metadata box includes provenance information for a portion of the encoded media content. The metadata box does not include the hash value itself. The portion signature for a portion of the encoded media content can be included as sample auxiliary information. For example, the portion signature for a chunk, fragment, or segment is included, unprotected, and accessed as sample auxiliary information, using an saiz or saio box to point to the location of the portion signature in a metadata box or other data for the portion of media content. (Or, for a different container format, the portion signature for a portion of media content is included in a different field, box, or object.)

For verification, a provenance claim validator receives the signed stream manifest. Using the long-term secure key, the provenance claim validator verifies the manifest signature, establishing that the live-stream public key is legitimate (and, if an indicator of validity period is present, establishing that the indicator of the validity period is legitimate). During live streaming, the provenance claim validator uses the live-stream public key to verify the portion signatures of the respective portions of the encoded media content.

The provenance claim validator can provide results that indicate whether provenance has been established or not established. Such results can be displayed concurrently with the reconstructed media content that is in scope for the results. For concurrent output, the rendering of reconstructed media content in a portion can be delayed until provenance has been established for that portion of the media content. If the portion is short, the provenance delay is also short. If the portion is longer, however, the provenance delay is longer.

If the encoded media content is played back after the expiration of the validity period, the provenance claim validator can indicate that provenance has not been established (e.g., due to the expiration of the validity period). A compliant playback device will show that provenance has not been established.

The hybrid approach is indirect in that the long-term secure key is not used to sign the hash values for the encoded media content but is instead used to sign the stream manifest including the live-stream public key, which is in turn used to verify the hash values for the encoded media content. The stream manifest-which provides the indirect hard binding assertion-itself contains no signed hashes and, consequently, is static for the validity period of the live-stream private key and live-stream public key. Even so, the stream manifest only needs to be verified once per stream, assuming the same live-stream key pair is used for the entire stream.

A. Types of Keys in Live-Stream Signing Approaches

A VOD approach to signing media content typically uses a long-term secure key, such as a hardware-protected live-stream key. The long-term secure key is difficult to compromise—by design, taking years or even decades to break—and is typically stored in a high-security environment such as a hardware security module—by design, making it difficult to steal or exfiltrate. (In particular, a hardware security module is designed to resist both network and physical attacks to access storage where a private key is kept. A hardware security module may even have some tamper resistance which will erase key material if the module or device containing the key is physically breached.) The long-term secure key is typically slow to apply (e.g., taking hundreds of milliseconds to apply), however, which makes it impractical for live streaming scenarios.

In the live-stream signing approaches described herein, advantages of using a long-term signing key are retained through the processing of signing and verifying stream manifests. At the same time, performance considerations of live streaming scenarios are also addressed. Compared to a long-term secure key, a live-stream private key is fast to apply (e.g., less than a millisecond) but easier to compromise. In particular, in contrast to the long-term key, a live-stream private key is typically stored in memory of a provenance claim generator. This makes signing operations with the live-stream key much faster, but it also means protections against the live-stream private key being stolen or exfiltrated are much weaker. For live streaming, this tradeoff is understood to be acceptable. An attacker has a much shorter period of time in which to attempt to steal the live-stream private key. Even if an attack is successful, the useful life of the live-stream private key (the validity period) is expected to be short.

In some implementations, live-stream keys are generated for a live stream. After the live streaming finishes, the live-stream keys are invalidated. Alternatively, live-stream keys can be rotated or switched during a live streaming session for a live stream. For example, a first pair of live-stream keys is used up to a first time. After the first time, a second pair of live-stream keys is used up to a second time, and so on.

In some implementations, each live stream has its own live-stream manifest. Different streams are signed with different live-stream manifests. Alternatively, a live-stream manifest is shared between multiple streams.

B. Balancing Provenance Latency and Playback Performance

In some implementations, portion signatures are generated using nested bindings. That is, portion signatures are generated for multiple portions of media content at different temporal hierarchy levels. For playback, a point of balance can be selected between provenance latency and playback performance by switching between the different temporal hierarchy levels. Generating portion signatures for multiple portions of media content at different temporal hierarchy levels imposes added costs at a provenance claim generator but enables functionality at the playback tool.

For some types of container format, a chunk includes encoded media content for a contiguous set of samples. Each of the samples is associated with a single timestamp (e.g., for a frame). A chunk can include multiple samples. A fragment includes one or more chunks. For example, a fragment includes chunks for 2-5 seconds of media content. A segment includes one or more fragments. For example, a segment includes 10-20 seconds of media content, starting with a chunk that can be independently decoded. A segment group includes one or more segments.

Providing portion signatures at different levels (e.g., all temporal hierarchy levels) allows a playback tool to decide a point of balance between provenance latency and playback performance. One playback tool can decide to verify (long) segments-playback is delayed in order to present provenance verification at the same time that media is rendered, but the overhead for provenance verification is not as high. Another playback tool can decide to verify (short) chunks-playback is not delayed very long in order to present provenance verification at the same time that media is rendered, but the overhead for provenance verification is higher. In this way, the same live-stream-key-signed stream can be transmitted to playback tools with different requirements or preferences in the tradeoff between provenance latency and playback performance.

Figure 3:
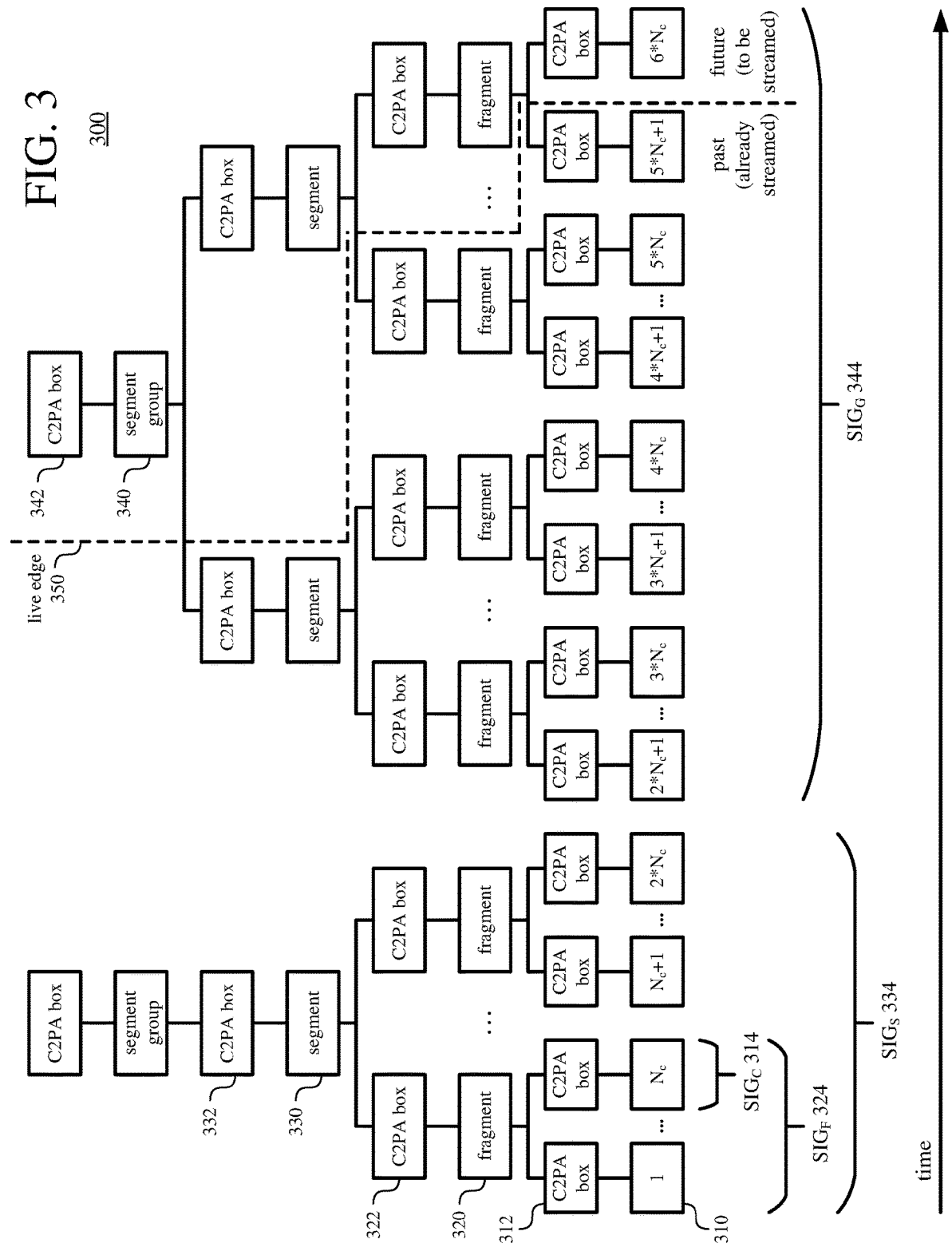
FIG. 3 is a diagram illustrating various features of provenance latency and playback performance for portions of media content signed with a live-stream private key according to one implementation.

FIG. 3 shows an example series (300) of portions signed at different temporal hierarchy levels for live-stream signing. FIG. 3 illustrates various features of provenance latency and playback performance for portions of media content signed. Portions on the "past" side of the live edge (350) have already been streamed. Portions on the "future" side of the live edge (350) have not yet been streamed.

In the example of FIG. 3, when encoded media content for a chunk (310) is complete, the provenance claim generator signs a hash value for the chunk (310) with a portion signature $SIG_C$ (314), which is included in a metadata box (312) for the chunk (310). This operation is repeated for the respective chunks as they complete. Concurrently, when encoded media content for a fragment (320) is complete, the provenance claim generator signs a hash value for the fragment (320) with a portion signature $SIG_F$ (324), which is included in a metadata box (322) for the fragment (320). This operation is repeated for the respective fragments as they complete. Concurrently, when encoded media content for a segment (330) is complete, the provenance claim generator signs a hash value for the segment (330) with a portion signature $SIG_S$ (334), which is included in a metadata box (332) for the segment (330). This operation is repeated for the respective segments as they complete. Concurrently, when encoded media content for a segment group is complete, the provenance claim generator signs a hash value for the segment group with a portion signature $SIG_G$. This operation is repeated for the respective segment groups. (FIG. 3 shows a portion signature $SIG_G$ (344) for a later segment group (340); the portion signature $SIG_G$ (344) will be included in a metadata box (342) for the segment group (340).)

Alternatively, the provenance claim generator can generate portion signatures at a single temporal hierarchy level or at multiple temporal hierarchy levels but not all temporal hierarchy levels.

To generate a portion signature for a portion, the provenance claim generator can calculate a hash value using all of the encoded media content of the portion. The provenance claim generator can also add other information such as timestamp and/or sequence number. Alternatively, for a higher-level portion, instead of calculating a hash value for all of the encoded media content of the higher-level portion, the provenance claim generator can calculate a hash value using the hash values of the constituent portions of the higher-level portion (e.g., calculating the hash value for a fragment using the hash values of chunks of the fragment).

In the example of FIG. 3, each segment starts with a key frame for adaptive streaming, and use of segment groups requires fixed bitrate streaming during a given segment group. Provenance latency per chunk can be estimated with a value $T_C$. The number of chunks per fragment can be represented with a value $N_C$. The number of fragments per segment can be represented with a value $N_F$. The number of segments per segment group can be represented with a value $N_S$.

In the example of FIG. 3, when encoded media content for a chunk has been received, the provenance claim validator can calculate a hash value for the chunk and validate the portion signature $SIG_C$ for the chunk. This operation can be repeated for the respective chunks as complete encoded media content is received for them. For this option, provenance latency ($T_C$) is low, but the overhead of establishing provenance is higher due to chunk-by-chunk validation operations.

Or, when encoded media content for a fragment has been received, the provenance claim validator can calculate a hash value for the fragment and validate the portion signature $SIG_F$ for the fragment. This operation can be repeated for the respective fragments as complete encoded media content is received for them. For this option, provenance latency ($T_F$) can be estimated as $T_C*N_C$. The provenance latency ($T_F$) is higher than the provenance latency ($T_C$) for a portion signature $SIG_C$ for a chunk, but the overhead of establishing provenance is lower due to fragment-by-fragment validation operations instead of chunk-by-chunk validation operations.

Or, when encoded media content for a segment has been received, the provenance claim validator can calculate a hash value for the segment and validate the portion signature $SIG_S$ for the segment. This operation can be repeated for the respective segments as complete encoded media content is received for them. For this option, provenance latency ($T_S$) can be estimated as $T_C*N_C*N_F$. Compared to the provenance latency ($T_F$) for a portion signature $SIG_F$ for a fragment, the provenance latency ($T_S$) is even higher, but the overhead of establishing provenance is even lower due to segment-by-segment validation operations instead of fragment-by-fragment validation operations.

Or, when encoded media content for a segment group has been received, the provenance claim validator can calculate a hash value for the segment group and validate the portion signature $SIG_G$ for the segment group. This operation can be repeated for the respective segment groups as complete encoded media content is received for them. For this option, provenance latency ($T_G$) can be estimated as $T_C*N_C*N_F*N_S$. Compared to other options, the provenance latency ($T_G$) is highest, but the overhead of establishing provenance is lowest due to group-by-group validation operations instead of segment-by-segment validation operations.

In practice, a provenance claim validator in a playback tool typically validates provenance at a single temporal hierarchy level. A distribution tool, when transcoding or re-packaging a stream, can validate provenance at all temporal hierarchy levels for which provenance information is available.

If needed, a playback tool can skip operations to establish provenance to recover timing. Because provenance can be independently established for different portions, this is permissible.

C. Example Processing Flows

Figure 4:
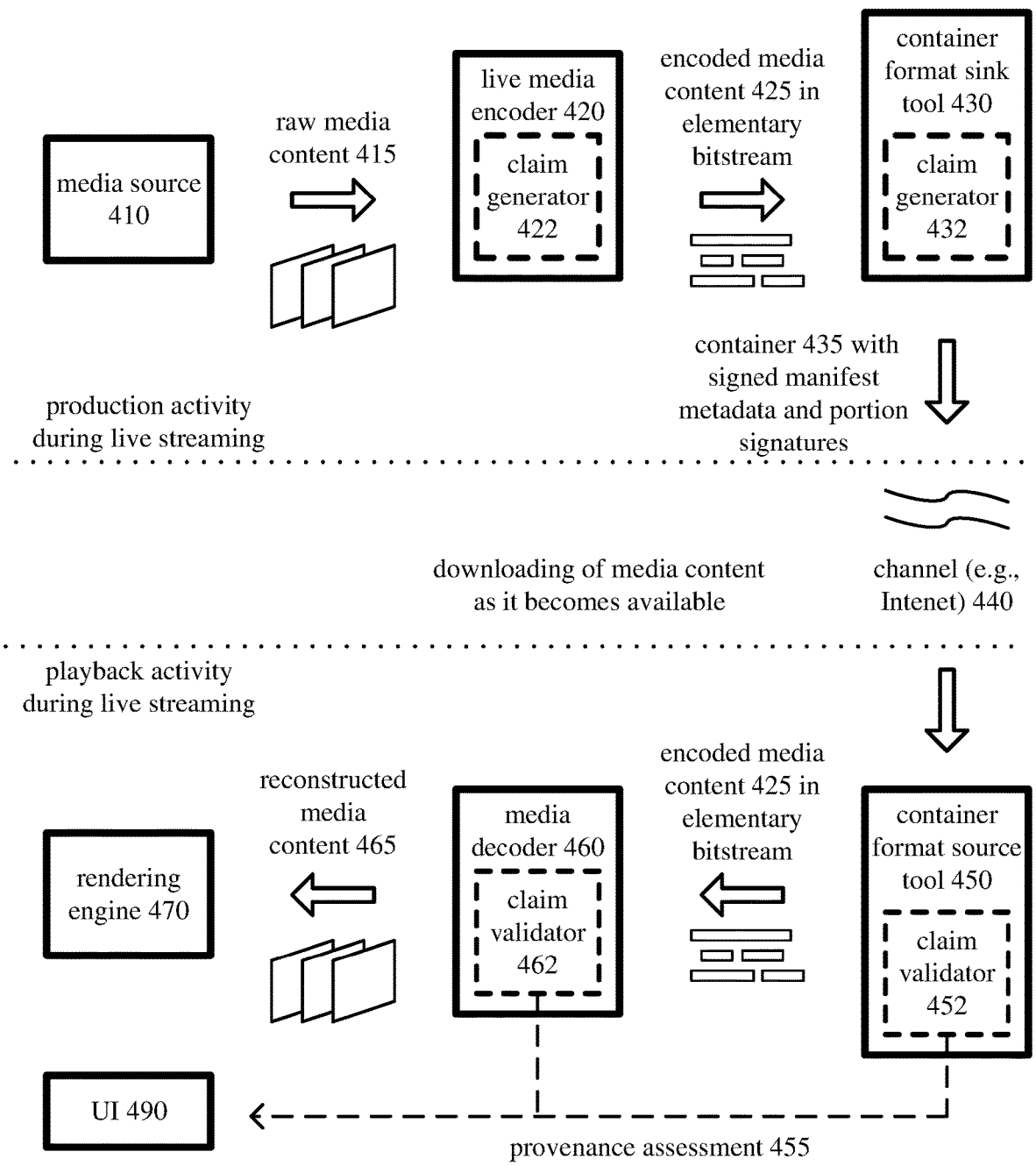
FIG. 4 is a diagram of an example processing flow when asserting and establishing provenance of media content during live streaming.

FIG. 4 shows an example processing flow (400) when asserting and establishing provenance of media content during live streaming. The processing flow (400) involves a media source (410), a media encoder (420) optionally including a provenance claim generator (422), a container format sink tool (430) optionally including a provenance claim generator (432), a container format source tool (450) optionally including a provenance claim validator (452), a media decoder (460) optionally including a provenance claim validator (462), a rendering engine (470), and a user interface ("UI") component (490) associated with reporting of provenance assessment information.

The media source (410) provides media content (415). For video, the media source (410) can be a camera, tuner card, storage media, screen capture module, animation output or other digital video source. A video source typically produces a sequence of video frames. For image content, the media source (410) can be a graphics output, scanner, medical imaging tool, or other digital image source. For audio content, the media source (410) can be a microphone, storage media, or other digital audio source.

Before the media encoder (420), the system (400) can include a buffer for storing media content (415) as well as a pre-processor that performs pre-processing (e.g., filtering) of the media content (415) before encoding.

The media encoder (420) receives media content (415) provided by the media source (410) and produces encoded media content (425) in an elementary media bitstream as output to the container format sink tool (430). The media encoder (420) can be a general-purpose encoding tool capable of operating in any of multiple encoding modes such as a low-latency encoding mode for live streaming or real-time communication, a transcoding mode, and a regular encoding mode for media playback from a file or stream, or it can be a special-purpose encoding tool adapted for one such encoding mode. The media encoder (420) can be implemented as an operating system module, as part of an application library, as a part of a standalone application or using special-purpose hardware.

Generally, the media encoder (420) includes multiple encoding modules that perform encoding tasks such as prediction, frequency transforms, quantization, and entropy coding. The exact operations performed by the media encoder (420) vary depending on codec format.

The encoded media content (425) in the elementary media bitstream is aggregated and buffered in a temporary coded data area. The encoded media content (425) that is aggregated can include, as part of the syntax of the elementary media bitstream, media metadata relating to the encoded media content (425). (If provenance claim generator (422) is in the media encoder (420), the encoded media content (425) can include provenance claim information, such as signed manifest metadata and portion signatures for portions of the media content, in one or more syntax structures of the elementary media bitstream. For example, the signed manifest metadata is in a sequence parameter set or other syntax structure for a sequence, and the portion signatures are in syntax structures for a group of pictures or samples of the media content associated with timestamps.)

The container format sink tool (430) receives the encoded media content (425) in the elementary bitstream. The container format sink tool (430) organizes the encoded media content (425) in a media container (435) according to a container format such as ISO/IEC 14496-12, ASF, WebM, or another container format. In example implementations, the container format sink tool (430) can packetize the encoded media content (425) for transmission as a media stream, in which case the container format sink tool (430) adds syntax elements as part of the syntax of the media transmission stream. Or, more generally, the container format sink tool (430) can implement one or more media system multiplexing protocols or transport protocols, in which case the container format sink tool (430) adds syntax elements as part of the syntax of the protocol(s). The container format sink tool (430) can be implemented as an operating system module, as part of an application library, as part of a standalone application or using special-purpose hardware.

The provenance claim generator (432) performs operations to assert provenance for portions of the encoded media content (425) during live streaming. Examples of such operations are described below. If the provenance claim generator (432) is in the container format sink tool (430), the media container (435) includes provenance claim information such as signed manifest metadata and portion signatures for portions of the media content, e.g., in one or more boxes or other objects in the media container (435).

The container format sink tool (430) provides the media container (435) for output to a channel (440). The channel (440) represents a communications connection (e.g., over the Internet) or another channel for the output.

The container format source tool (450) receives and processes the media container (435). The container format source tool (450) removes the encoded media content (425) that is organized in the media container (435) according to a container format such as ISO/IEC 14496-12, ASF, WebM or another container format. Depending on implementation, the container format source tool (450) can de-packetize encoded media content that has been aggregated for transmission as a media stream, in which case the container format source tool (450) parses syntax elements added as part of the syntax of the media transmission stream. Or, more generally, the container format source tool (450) can implement one or more media system demultiplexing protocols or transport protocols, in which case the container format source tool (450) parses syntax elements added as part of the syntax of the protocol(s). The container format source tool (450) can be implemented as an operating system module, as part of an application library, as part of a standalone application or using special-purpose hardware.

The provenance claim validator (452) performs operations to establish provenance for portions of the encoded media content (425) during live streaming. Examples of such operations are described below. If the provenance claim validator (452) is in the container format source tool (450), the media container (435) includes provenance claim information such as signed manifest metadata and portion signatures for portions of the media content, e.g., in one or more boxes or other objects in the media container (435), for processing by the provenance claim validator (452).

The encoded media content (425) that is output from the container format source tool (450) is stored in a temporary coded data area until a sufficient quantity of such data has been received. The encoded media content (425) that is buffered can include, as part of the syntax of an elementary media bitstream, media metadata relating to the encoded media content (425) (including provenance claim information, if such information is included in syntax structures for the elementary media bitstream and processed by a provenance claim validator (462) in the media decoder (460)).

The media decoder (460) receives encoded media content (425) provided by the container format source tool (450) and produces reconstructed media content (465). The media decoder (460) can be a general-purpose decoding tool capable of operating in any of multiple decoding modes such as a low-latency decoding mode for live streaming or real-time communication and a regular decoding mode for media playback from a file or stream, or it can be a special-purpose decoding tool adapted for one such decoding mode. The media decoder (460) can be implemented as an operating system module, as part of an application library, as part of a standalone application, or using special-purpose hardware.

Generally, the media decoder (460) includes multiple decoding modules that perform decoding tasks such as entropy decoding, inverse quantization, inverse frequency transforms and prediction. The exact operations performed by the media decoder (460) can vary depending on codec format. A temporary memory storage area can include multiple buffer storage areas for reconstructed media content (465). The rendering engine (470) processes the reconstructed media content (465) for output.

The UI component (490) receives provenance assessment information (455) from the provenance claim validator (452) and presents an indication of the results of validating provenance for portions of media content. For example, depending on the provenance assessment information received from the provenance claim validator (452), the UI component (490) presents a visual indication that provenance has been established, or that provenance has not been established, concurrent with rendering of the reconstructed versions of the portions of the media content by the rendering engine (470).

FIG. 4 shows the provenance claim generator (422/432) and provenance claim validator (452/462) in the container format sink tool (430) and container format source tool (450), respectively, or, alternatively, in the media encoder (420) and media decoder (460), respectively. Alternatively, a provenance claim generator and provenance claim validator can be in different locations.

The processing flow (400) shown in FIG. 4 does not include a distribution tool such as a streaming service, transcoder, etc. Alternatively, a processing flow includes a distribution tool with a container format source tool (450), a provenance claim validator (452), a container format sink tool (430), and a provenance claim generator (432). In this scenario, a content creator can produce, encode, and sign media content. With a provenance claim validator (452), the distribution tool can verify the signed media content as being provided by the content creator. Then, with a provenance claim generator (432), the distribution tool can re-sign the encoded media content (425) to assert provenance of the portions of encoded media content (on behalf of the distribution tool). For transcoding operations, the distribution tool can also include a media decoder (460) and a media encoder (420). In the distribution tool, the media decoder (460) and media encoder (420) can transcode the encoded media content, before the provenance claim generator (432) re-signs the re-encoded media content to assert provenance of the portions of encoded media content (on behalf of the distribution tool). Subsequently, a playback tool can verify the re-signed media content, to establish provenance of the distributor. In doing so, the content creator is indirectly verified, because the playback tool trusts the distributor.

In another scenario, after live streaming has finished, a distribution tool can replace live-stream-key-signed media content with VOD-signed media content, after the distribution tool has all of the live-stream-key-signed media content. In this scenario, the distribution tool provides a new stream manifest with a new manifest signature according to the VOD approach. Alternatively, a field in the signed manifest for the live-stream-key-signed media content can preemptively include a reference to an address, which will contain VOD-signed media content after the media content has been re-signed according to the VOD approach, or a manifest for the VOD-signed media content.

D. Example Object Formats for Manifest Metadata and Portion Signatures

Figure 5A:
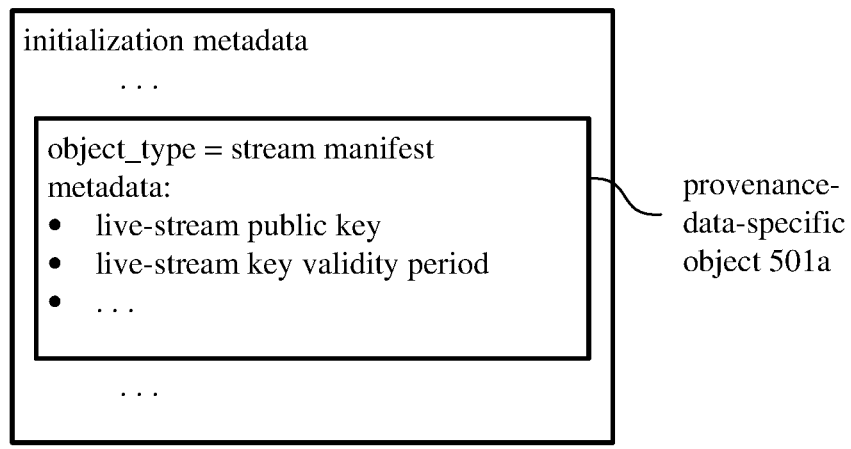
FIG. 5a is a diagram of an example object including manifest metadata with a live-stream private key and indicator of validity period.
Figure 5B:
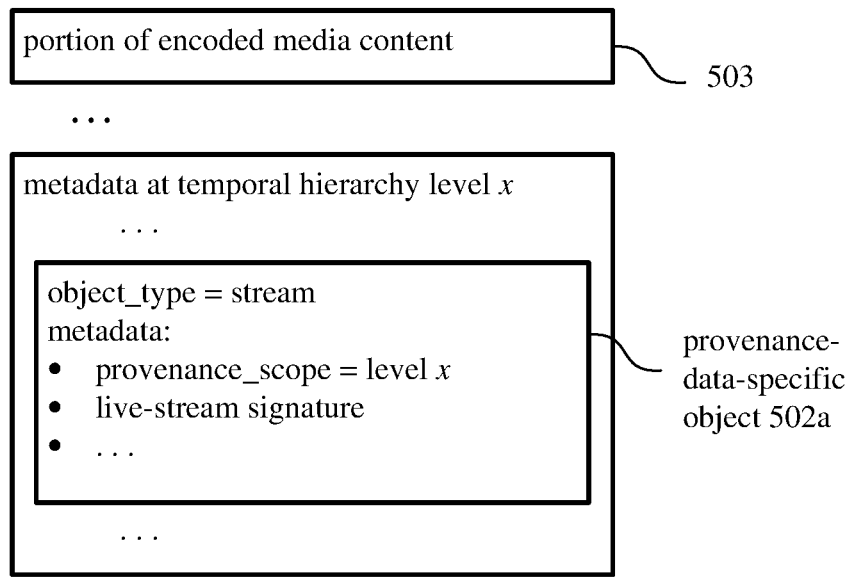
FIG. 5b is a diagram of an example object including a portion signature.

FIG. 5a shows an example object (501), from a bitstream, including manifest metadata with a live-stream public key and indicator of validity period, and FIG. 5b shows an example object (502), from a bitstream, including a portion signature.

In FIG. 5a, initialization metadata includes a provenance-data-specific object (501a). The provenance-data-specific object (501a) includes a type field designating the type of the object. The type field specifies that the object (501a) includes manifest metadata for a stream manifest (object_type=stream manifest). The provenance-data-specific object (501a) also includes metadata including a live-stream public key and an indicator of the validity period (live-stream key validity period).

The indicator of the validity period can specify an end time after which the provenance of the media content is no longer asserted. If the end time is undefined, the live stream effectively has an unbounded validity period, which is inadvisable for typical applications to the extent the live-stream private key is not well protected. The indicator of the validity period can also specify a start time that begins the validity period. Alternatively, the start time that begins the validity period is implied by information in the bitstream and inferred during validation to be the present time. Or, the validity period can be expressed as a duration relative to a start time, with the start time being expressly specified or implied to be the present time. Or, the validity period can be implied by other information, e.g., information that designates a session as being a live-streaming session or designates a stream as being a live stream, in which case the manifest metadata can lack any express indicator of the validity period.

The manifest metadata specifies an indirect hard binding assertion. The manifest metadata lacks any signature based on a hash value for any of the media content. Also, the manifest metadata is static for the validity period.

In FIG. 5b, metadata at temporal hierarchy level x (such as chunk level, fragment level, or segment level) includes a provenance-data-specific object (502a). The provenance-data-specific object (502a) includes a type field designating the type of the object. The type field specifies that the object (502a) includes a portion signature for a signed portion of media content (object_type=stream). The provenance-data-specific object (502a) also includes metadata including an indicator of the scope of the portion signature (provenance_scope=level x) and the portion signature itself (live-stream signature).

In FIG. 5b, the metadata at temporal hierarchy level x that includes a provenance-data-specific object (502a) with a portion signature is signaled after the portion of media content (503) in scope for the portion signature. For example, a portion signature for a chunk is signaled after the encoded media content for the chunk. Or, as another example, a portion signature for a fragment is signaled after the encoded media content for the last chunk of the fragment. Alternatively, the metadata at temporal hierarchy level x that includes a provenance-data-specific object (502a) with a portion signature can be signaled before the portion of media content (503) in scope for the portion signature. Both the portion of media content and the portion signature for the appropriate level of the temporal hierarchy are received by a validator in order for validation to happen, but the validator can receive them in either order (signature first then content, or vice versa), buffer one while waiting for the other, and then perform the validation when both have arrived.

Figure 6:
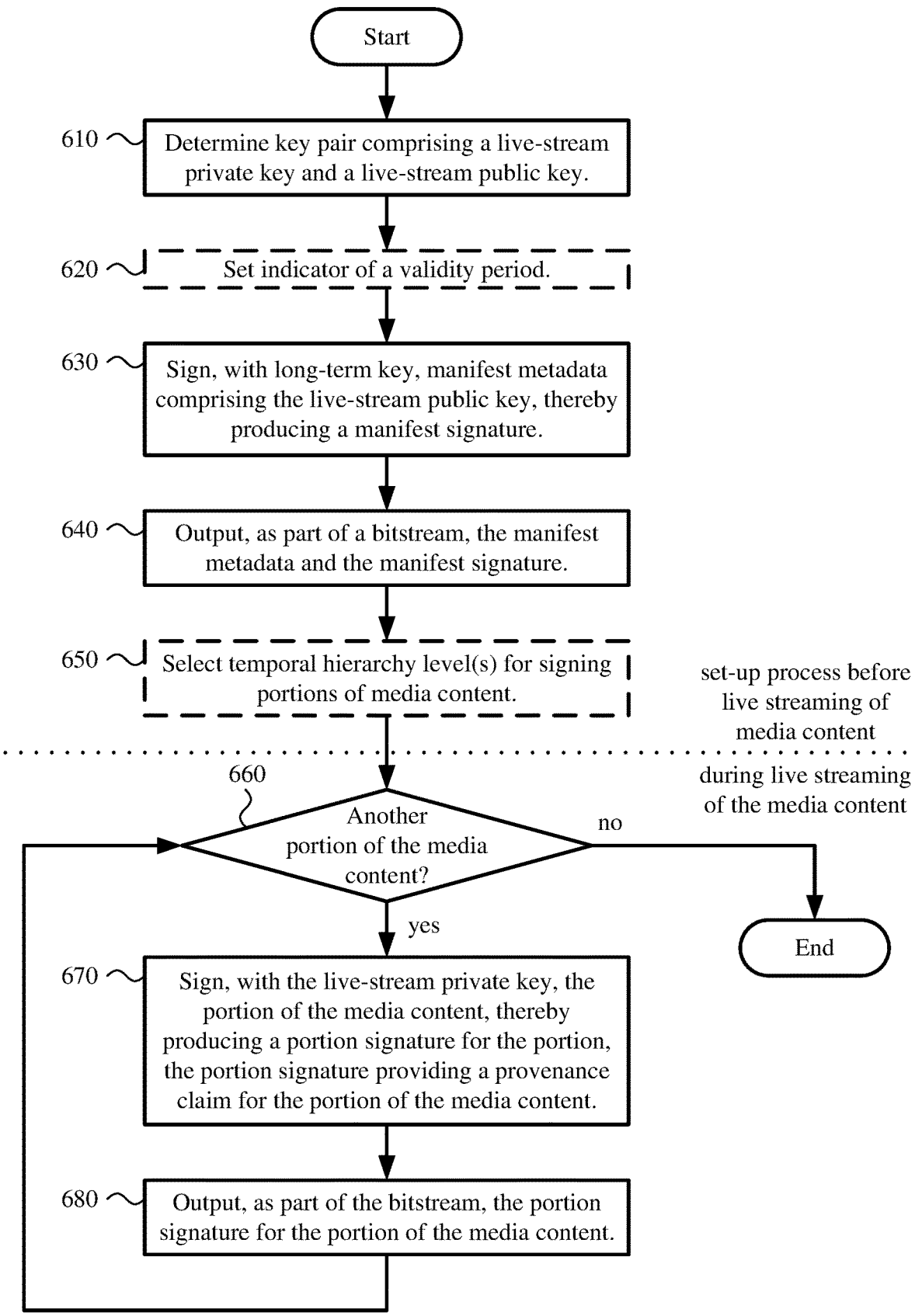
FIG. 6 is a flowchart illustrating a generalized technique for asserting provenance of media content during live streaming, from the perspective of a provenance claim generator.

E. Example Approaches to Asserting and Establishing Provenance of Media Content During Live Streaming FIG. 6 shows a generalized technique (600) for asserting provenance of media content during live streaming, from the perspective of a provenance claim generator. A computer system that implements a provenance claim generator, as described with reference to FIGS. 1-3 or otherwise, can perform the technique (600).

Figure 7:
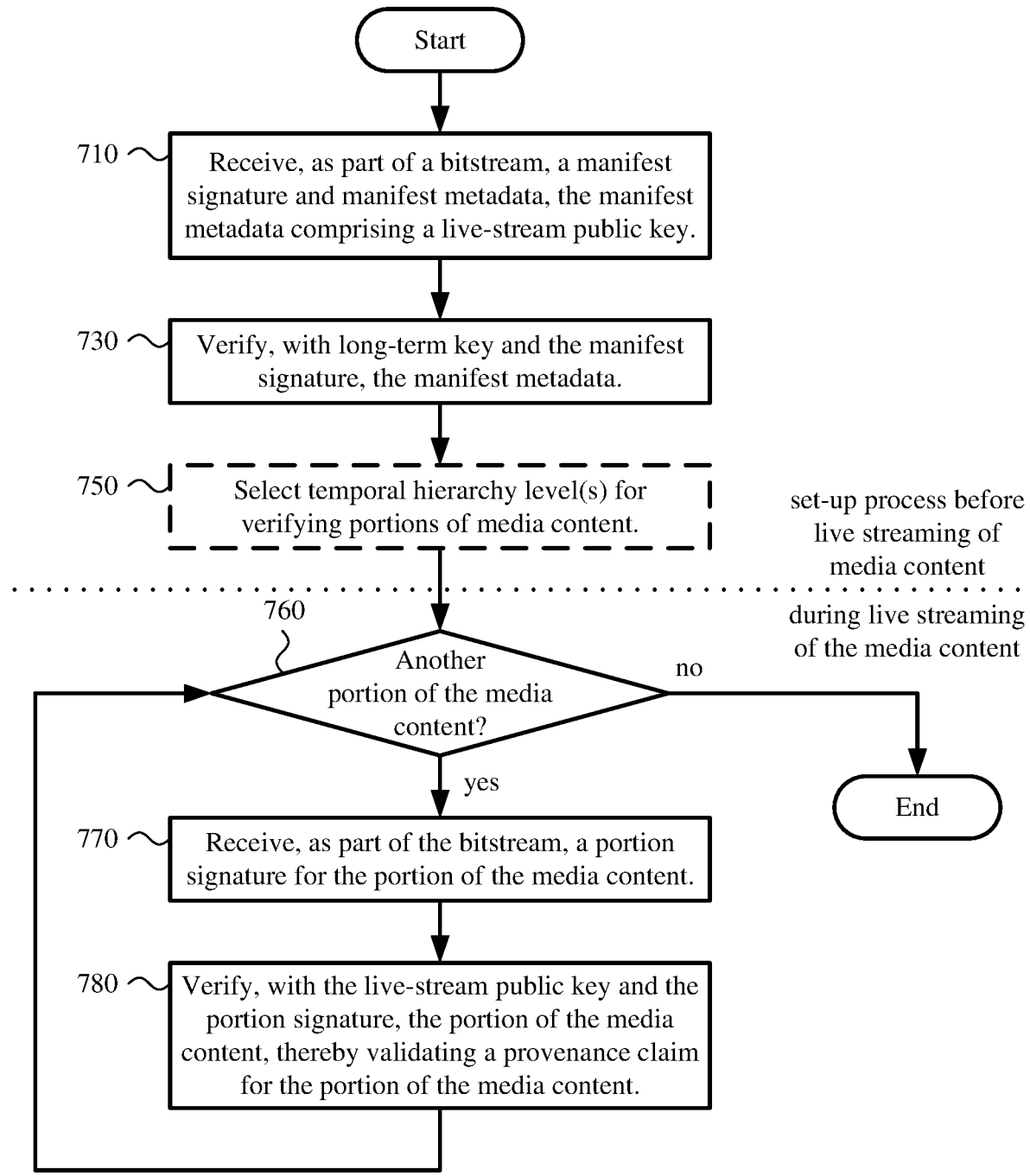
FIG. 7 is a flowchart illustrating a generalized technique for establishing provenance of media content during live streaming, from the perspective of a provenance claim validator.

Conversely, FIG. 7 shows a generalized technique (700) for establishing provenance of media content, from the perspective of a provenance claim validator. A computer system that implements a provenance claim validator, as described with reference to FIGS. 1-3 or otherwise, can perform the technique (700).

In the techniques (600, 700) of FIGS. 6 and 7, the media content can be video content, audio content, text content, texture content, shape content, or another type of content. Typically, the media content is encoded media content organized according an elementary media format. In this case, each of the portions of the media content includes one or more units of the encoded media content organized according to the elementary media format.

With reference to FIG. 6, to start the system that implements the provenance claim generator performs operations as part of a set-up process, before live streaming of the media content. Specifically, the system determines (610) a key pair that includes a live-stream private key and a live-stream public key. For example, the system itself generates the key pair. Or, as another example, the system requests the key pair from a key generator, which can be an external service, and receives the key pair from the key generator. Alternatively, the system determines (610) the key pair in some other way.

The system can also set (620) an indicator of a validity period. Examples of semantics for the indicator of the validity period are described above. Alternatively, the validity period can be implied by other information, e.g., information that designates a session as being a live-streaming session or designates a stream as being a live stream.

With a long-term key, the system signs (630) manifest metadata that includes the live-stream public key (and, if included in the manifest metadata, the indicator of the validity period). This produces a manifest signature. Examples of formats for signaling the manifest metadata are described above. The long-term key can, for example, be a long-term private key of a second key pair, which also includes a long-term public key, where the long-term private key is maintained in a highly secure environment that may be slow to access. In alternative implementations, the long-term key can be a long-term symmetric key established as part of a key-exchange protocol between multiple entities (e.g., content creator and distributor; or content creator and end users; or distributor and end users), where the long-term key is maintained in a highly secure environment that may be slow to access. Or, the long-term key can be set in some other way. In any case, the long-term key is associated with the provenance claim generator, so the long-term key can be used to sign the manifest metadata.

To sign the manifest metadata, the system can determine a reference hash value for the manifest metadata, then perform a key signing operation on the reference hash value for the manifest metadata using the long-term key. This produces the manifest signature. For example, the system uses an implementation of the Elliptic Curve Digital Signature Algorithm ("ECDSA") to sign the reference hash value for the manifest metadata using the long-term key. Alternatively, the system can sign the manifest metadata in some other way.

The system outputs (640), as part of a bitstream, the manifest metadata and the manifest signature. The bitstream can be organized according to a container format, which is organized as a series of boxes or other objects.

After performing the operations as part of the set-up process, the system performs operations during live streaming of the media content. Specifically, the system signs portions of the media content during the live streaming. The system checks (660) whether there is another portion of media content to sign. If not, the technique (600) ends. If there is another portion of media content to sign, the system signs (670) the portion of the media content with the live-stream private key, which produces a portion signature for the portion of the media content, and outputs (680) the portion signature for the portion of the media content as part of the bitstream. The portion signature provides a provenance claim for the portion of the media content. Examples of formats for signaling the portion signature are described above.

To sign the portion of the media content, the system can determine a reference hash value for the portion of the media content, then perform a private key signing operation on the reference hash value for the portion of the media content using the live-stream private key. This produces the portion signature. For example, the system uses an implementation of the ECDSA to sign the reference hash value for the portion of the media content using the live-stream private key. Alternatively, the system can sign the portion of the media content in some other way.

FIG. 6 also shows an optional operation to select (650) one or more temporal hierarchy levels for signing portions of media content. In some implementations, the portions of the media content are part of a hierarchical temporal organization having multiple temporal hierarchy levels. For example, the multiple temporal hierarchy levels include chunk level, fragment level, segment level, and segment group level. Alternatively, the temporal hierarchy levels are organized in some other way.

The system can select a single one of the multiple temporal hierarchy levels for signing the portions of the media content. In this case, the signing of the portions of the media content is performed for the portions at the selected temporal hierarchy level (e.g., only at chunk level; or only at fragment level; or only at segment level; or only at segment group level).

Or, the system can select two or more of the multiple temporal hierarchy levels for signing the portions of the media content (e.g., two or more of chunk level, fragment level, segment level, and segment group level). This enables selection of a point of balance between provenance latency and playback performance. The portions of the media content that are signed include level-specific portions that overlap between the temporal hierarchy levels (e.g., segments overlapping fragments, which overlap chunks). In this case, the signing of the portions of the media content includes signing the level-specific portions at each of the selected temporal hierarchy levels (e.g., signing chunks for chunk-level signing; signing fragments for fragment-level signing).

With reference to FIG. 7, to start, the system that implements the provenance claim validator performs operations as part of a set-up process, before live streaming of the media content. Specifically, the system receives (710), as part of a bitstream, a manifest signature and manifest metadata. The manifest metadata includes a live-stream public key. The manifest metadata can also include an indicator of a validity period or, alternatively, the validity period can be implied. Examples of semantics for the indicator of the validity period are described above. The bitstream can be organized according to a container format, which is organized as a series of boxes or other objects.

With a long-term key and the manifest signature, the system verifies (730) the manifest metadata. The long-term key can, for example, be a long-term public key of a second key pair, which also includes a long-term private key, where the long-term private key is maintained in a highly secure environment that may be slow to access. In alternative implementation, the long-term key can be a long-term symmetric key established as part of a key-exchange protocol between multiple entities (e.g., content creator and distributor; or content creator and end users; or distributor and end users), where the long-term symmetric key is maintained in a highly secure environment that may be slow to access. Or, the long-term key can be set in some other way. In any case, the long-term key is associated with the provenance claim generator, so the long-term key can be used to sign the manifest metadata.

To verify the manifest metadata, the system can determine a verification hash value for the manifest metadata and verify the manifest signature using the long-term key. For example, the system uses an implementation of the ECDSA to verify the manifest signature using the long-term key and the verification hash value for the manifest metadata. Alternatively, the system can verify the manifest signature of the manifest metadata in some other way.

After performing the operations as part of the set-up process, the system performs operations during live streaming of the media content. Specifically, the system verifies portions of the media content during the live streaming. The system checks (760) whether there is another portion of media content to verify. If not, the technique (700) ends. If there is another portion of media content to verify, the system receives (770), as part of the bitstream, a portion signature for the portion of the media content and, with the live-stream public key and the portion signature, verifies (780) the portion of the media content. This validates a provenance claim for the portion of the media content.

To verify the portion of the media content, the system can determine a verification hash value for the portion of the media content and verify the portion signature using the live-stream public key. For example, the system uses an implementation of the ECDSA to verify the portion signature using the live-stream public key and the verification hash value for the portion of the media content. Alternatively, the system can verify the portion signature for the portion of the media content in some other way.

FIG. 7 also shows an optional operation to select (750) one or more temporal hierarchy levels for signing portions of media content. In some implementations, the portions of the media content are part of a hierarchical temporal organization having multiple temporal hierarchy levels. For example, the multiple temporal hierarchy levels include chunk level, fragment level, segment level, and segment group level. Alternatively, the temporal hierarchy levels are organized in some other way.

The system can select a single one of the multiple temporal hierarchy levels for verifying the portions of the media content. In this way, the system can select a point of balance between provenance latency and playback performance. The verification of the portions of the media content is performed for the portions at the selected temporal hierarchy level (e.g., only at chunk level; or only at fragment level; or only at segment level; or only at segment group level).

Or, the system can select two or more of the multiple temporal hierarchy levels for verifying the portions of the media content (e.g., two or more of chunk level, fragment level, segment level, and segment group level). Thus, the system can select multiple points of balance between provenance latency and playback performance. The portions of the media content that are verified include level-specific portions that overlap between the temporal hierarchy levels (e.g., segments overlapping fragments, which overlap chunks). In this case, the verification of the portions of the media content includes verifying the level-specific portions at each of the selected temporal hierarchy levels (e.g., verifying chunks for chunk-level verification; verifying fragments for fragment-level verification).

F. Additional Details

For additional details about C2PA technology, see the "C2PA Technical Specification," release 1.2 (Nov. 2, 2022) and the "C2PA Technical Specification," release 1.3 (Apr. 3, 2023).

For additional details about an example container format, see ISO/IEC 14496-14.

G. EXAMPLES

The innovative features described herein include the following examples.

| | Example |
|---|---|
| A1 | In a computer system, a method of asserting provenance of media content during live streaming, the method comprising: determining a key pair comprising a live-stream private key and a live-stream public key; signing, with a long-term key, manifest metadata comprising the live-stream public key, thereby producing a manifest signature; outputting, as part of a bitstream, the manifest metadata and the manifest signature; and for each of multiple portions of media content during live streaming of the media content: signing, with the live-stream private key, the portion of the media content, thereby producing a portion signature for the portion of the media content, the portion signature providing a provenance claim for the portion of the media content; and outputting, as part of the bitstream, the portion signature for the portion of the media content. |
| A2 | The method of A1, wherein the determining the key pair comprises: generating the key pair; or requesting the key pair from a key generator and receiving the key pair from the key generator. |
| A3 | The method of A1 or A2, wherein the long-term key is: a long-term private key of a second key pair, the second key pair also including a long-term public key. |
| A4 | The method of any one of A1-A3, wherein the signing the manifest metadata includes: determining a reference hash value for the manifest metadata; and signing the reference hash value for the manifest metadata using the long-term key, thereby producing the manifest signature. |

| | Example |
|---|---|
| A5 | The method of any one of A1-A4, wherein the signing the portion of the media content includes:<br>determining a reference hash value for the portion of the media content; and<br>signing the reference hash value for the portion of the media content using the live-stream private key, thereby producing the portion signature for the portion of the media content. |
| A6 | The method of any one of A1-A5, wherein the multiple portions of the media content are part of a hierarchical temporal organization having multiple temporal hierarchy levels. |
| A7 | The method of A6, wherein the multiple temporal hierarchy levels include chunk level, fragment level, segment level, and segment group level, and wherein:<br>a chunk includes encoded media content for a contiguous set of samples, each of the samples being associated with a single timestamp;<br>a fragment includes one or more chunks;<br>a segment includes one or more fragments; and<br>a segment group includes one or more segments. |
| A8 | The method of A6, further comprising:<br>selecting one of the multiple temporal hierarchy levels for the signing the respective portions of the media content, wherein the signing the respective portions of the media content is performed for the respective portions at the selected temporal hierarchy level. |
| A9 | The method of A6, further comprising:<br>selecting two or more of the multiple temporal hierarchy levels for the signing the respective portions of the media content, thereby enabling selection of a point of balance between provenance latency and playback performance, the multiple portions of the media content including level-specific portions that overlap between the multiple temporal hierarchy levels, wherein the signing the respective portions includes signing the level-specific portions at each of the selected two or more of the multiple temporal hierarchy levels. |
| A10 | The method of A9, wherein the selected two or more of the multiple temporal hierarchy levels include two or more of chunk level, fragment level, segment level, and segment group level. |
| A11 | The method of any one of A1-A10 further comprising:<br>setting an indicator of a validity period, wherein the manifest metadata further includes the indicator of the validity period. |
| B1 | In a computer system, a method of establishing provenance of media content during live streaming, the method comprising:<br>receiving, as part of a bitstream, a manifest signature and manifest metadata, the manifest metadata comprising a live-stream public key;<br>verifying, with a long-term key and the manifest signature, the manifest metadata; and<br>for each of multiple portions of media content during live streaming of the media content:<br>receiving, as part of the bitstream, a portion signature for the portion of the media content; and<br>verifying, with the live-stream public key and the portion signature, the portion of the media content, thereby validating a provenance claim for the portion of the media content. |
| B2 | The method of B1, wherein the long-term key is:<br>a long-term public key of a second key pair, the second key pair also including a long-term private key. |
| B3 | The method of B1 or B2, wherein the verifying the manifest metadata includes:<br>determining a verification hash value for the manifest metadata;<br>verifying the manifest signature using the long-term key, thereby producing a reference hash value for the manifest metadata; and<br>comparing the reference hash value for the manifest metadata and the verification hash value for the manifest metadata. |
| B4 | The method of any one of B1-B3, wherein the verifying the portion of the media content includes:<br>determining a verification hash value for the portion of the media content;<br>verifying the manifest signature using the live-stream public key, thereby producing a reference hash value for the portion of the media content; and<br>comparing the reference hash value for the portion of the media content and the verification hash value for the portion of the media content. |
| B5 | The method of any one of B1-B4, wherein the multiple portions of the media content are part of a hierarchical temporal organization of portions having multiple temporal hierarchy levels. |
| B6 | The method of B5, wherein the multiple temporal hierarchy levels include chunk level, fragment level, segment level, and segment group level, and wherein:<br>a chunk includes encoded media content for a contiguous set of samples, each of the samples being associated with a single timestamp;<br>a fragment includes one or more chunks;<br>a segment includes one or more fragments; and<br>a segment group includes one or more segments. |
| B7 | The method of B5, further comprising:<br>selecting one of the multiple temporal hierarchy levels for the verifying the respective portions of the media content, thereby selecting a point of balance |

| | Example |
|---|---|
| | between provenance latency and playback performance, wherein the verifying the respective portions of the media content is performed for the respective portions at the selected temporal hierarchy level. |
| B8 | The method of B7, wherein the selected temporal hierarchy level is chunk level, fragment level, segment level, or segment group level. |
| B9 | The method of B5, further comprising:<br>selecting two or more of the multiple temporal hierarchy levels for the verifying the respective portions of the media content, the multiple portions of the media content including level-specific portions that overlap between the multiple temporal hierarchy levels, wherein the verifying the respective portions includes verifying the level-specific portions at each of the selected two or more of the multiple temporal hierarchy levels. |
| B10 | The method of B9, wherein the selected two or more of the multiple temporal hierarchy levels include two or more of chunk level, fragment level, segment level, and segment group level. |
| B11 | The method of any one of B1-B10, wherein the manifest metadata further includes an indicator of a validity period. |
| AB1 | The method of any one of A1-A11 and B1-B11 wherein the media content is selected from the group consisting of video content, audio content, text content, texture content, and shape content. |
| AB2 | The method of any one of A11 or B11, wherein the indicator of the validity period specifies an end time after which the provenance of the media content is no longer asserted. |
| AB3 | The method of AB2, wherein the indicator of the validity period also specifies a start time that begins the validity period. |
| AB4 | The method of AB2, wherein a start time that begins the validity period is inferred to be present time. |
| AB5 | The method of any one of A1-A11, B1-B11, and AB1-AB4, wherein the bitstream is organized according to a container format, the container format being organized as a series of boxes or other objects. |
| AB6 | The method of any one of A1-A11, B1-B11, and AB1-AB5, wherein the media content is encoded media content organized according an elementary media format, each of the multiple portions of the media content including one or more units of the encoded media content organized according to the elementary media format. |
| AB7 | The method of any one of A1-A11, B1-B11, and AB1-AB6, wherein the manifest metadata is signaled, in the bitstream, as part of an object of the bitstream, the object including:<br>a field designating type of the object, the type specifying the object includes the manifest metadata;<br>the live-stream public key; and<br>the indicator of the validity period. |
| AB8 | The method of AB7, wherein the manifest metadata lacks any signature based on a hash value for any of the media content. |
| AB9 | The method of AB7 wherein the manifest metadata is static for the validity period. |
| AB10 | The method of any one of A1-A11, B1-B11, and AB1-AB6, wherein the portion signature is signaled, in the bitstream, as part of an object of the bitstream, the object including:<br>a field designating type of the object, the type specifying the object includes the portion signature; and<br>the portion signature. |
| AB11 | One or more non-transitory computer-readable media having stored thereon computer-executable instructions for causing one or more processing units, when programmed thereby, to perform operations for the method of any one of A1-A11, B1-B11, and AB1-AB10. |
| AB12 | A computer system comprising one or more processing units and memory, the computer system being configured to perform operations for the method of any one of A1-A11, B1-B11, and AB1-AB10. |
| AB13 | A computer system comprising:<br>a media encoder configured to produce the portions of the media content; and<br>a provenance claim generator configured to perform the operations of any one of A1-A11 and AB1-AB10. |
| AB14 | The computer system of AB13, further comprising:<br>a container format sink tool, wherein the provenance claim generator is part of the container format sink tool, part of the media encoder, or separate from the container format sink tool and the media encoder. |
| AB15 | A computer system comprising:<br>a provenance claim validator configured to perform the operations of any one of B1-B11, thereby establishing the provenance of the media content; and<br>a provenance claim generator configured to perform the operations of any one of A1-A11 and AB1-AB10, thereby asserting a different provenance of the media content. |
| AB16 | The computer system of AB15, further comprising:<br>a container format source tool, wherein the provenance claim validator is part of the container format source tool, part of the media decoder, or separate from the container format source tool and the media decoder; and |

-continued

| | Example |
|---|---|
| | a container format sink tool, wherein the provenance claim generator is part of the container format sink tool, part of the media encoder, or separate from the container format sink tool and the media encoder. |
| AB17 | 39. A computer system comprising:<br>a provenance claim validator configured to perform the operations of any one of B1-B11; and<br>a media decoder configured to decode the portions of the media content. |
| AB18 | The computer system of AB17, further comprising:<br>a container format source tool, wherein the provenance claim validator is part of the container format source tool, part of the media decoder, or separate from the container format source tool and the media decoder. |
| AB19 | One or more non-transitory computer-readable media having stored thereon signed media content produced by operations for the method of any one of A1-A11 and AB1-AB10. |
| AB20 | One or more non-transitory computer-readable media having stored thereon signed media content organized to facilitate verification by operations for the method of any one of B1-B11 and AB1-AB10. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method of asserting provenance of media content during live streaming, the method comprising:
   determining a key pair comprising a live-stream private key and a live-stream public key;
   signing, with a long-term key, manifest metadata comprising the live-stream public key, thereby producing a manifest signature;
   outputting, as part of a bitstream, the manifest metadata and the manifest signature; and
   for each of multiple portions of media content during live streaming of the media content:
      signing, with the live-stream private key, the portion of the media content, thereby producing a portion signature for the portion of the media content, the portion signature providing a provenance claim for the portion of the media content; and
      outputting, as part of the bitstream, the portion signature for the portion of the media content.

2. The method of claim 1, wherein the determining the key pair comprises:
   generating the key pair; or
   requesting the key pair from a key generator and receiving the key pair from the key generator.

3. The method of claim 1, wherein the long-term key is a long-term private key of a second key pair, the second key pair also including a long-term public key.

4. The method of claim 1, wherein:
   the signing the manifest metadata includes:
      determining a reference hash value for the manifest metadata; and
      signing the reference hash value for the manifest metadata using the long-term key, thereby producing the manifest signature; and
   the signing the portion of the media content includes:
      determining a reference hash value for the portion of the media content; and
      signing the reference hash value for the portion of the media content using the live-stream private key, thereby producing the portion signature for the portion of the media content.

5. The method of claim 1, wherein the multiple portions of the media content are part of a hierarchical temporal organization having multiple temporal hierarchy levels, the method further comprising:
   selecting one of the multiple temporal hierarchy levels for the signing the portions, respectively, of the media content, wherein the signing the respective portions of the media content is performed for the respective portions at the selected temporal hierarchy level.

6. The method of claim 1, wherein the multiple portions of the media content are part of a hierarchical temporal organization having multiple temporal hierarchy levels, the method further comprising:
   selecting two or more of the multiple temporal hierarchy levels for the signing the portions, respectively, of the media content, thereby enabling selection of a point of balance between provenance latency and playback performance, the multiple portions of the media content including level-specific portions that overlap between the multiple temporal hierarchy levels, wherein the signing the respective portions includes signing the level-specific portions at each of the selected two or more of the multiple temporal hierarchy levels.

7. The method of claim 1, further comprising:
   setting an indicator of a validity period, wherein the manifest metadata further includes the indicator of the validity period, and wherein the indicator of the validity period specifies an end time after which the provenance of the media content is no longer asserted.

8. The method of claim 1, wherein the manifest metadata is signaled, in the bitstream, as part of an object of the bitstream, the object including:
   a field designating type of the object, the type specifying the object includes the manifest metadata;
   the live-stream public key; and
   an indicator of a validity period.

9. The method of claim 8, wherein the manifest metadata lacks any signature based on a hash value for any of the media content, and wherein the manifest metadata is static for the validity period.

10. The method of claim 1, wherein the portion signature is signaled, in the bitstream, as part of an object of the bitstream, the object including:

a field designating type of the object, the type specifying the object includes the portion signature; and the portion signature.

11. A computer system comprising a processing system and memory, wherein the computer system is configured to perform operations to establish provenance of media content during live streaming, the operations comprising:

receiving, as part of a bitstream, a manifest signature and manifest metadata, the manifest metadata comprising a live-stream public key;

verifying, with a long-term key and the manifest signature, the manifest metadata; and for each of multiple portions of media content during live streaming of the media content:

receiving, as part of the bitstream, a portion signature for the portion of the media content; and verifying, with the live-stream public key and the portion signature, the portion of the media content, thereby validating a provenance claim for the portion of the media content.

12. The computer system of claim 11, wherein the long-term key is a long-term public key of a second key pair, the second key pair also including a long-term private key.

13. The computer system of claim 11, wherein:

the verifying the manifest metadata includes:

determining a verification hash value for the manifest metadata;

verifying the manifest signature using the long-term key, thereby producing a reference hash value for the manifest metadata; and comparing the reference hash value for the manifest metadata and the verification hash value for the manifest metadata; and the verifying the portion of the media content includes:

determining a verification hash value for the portion of the media content;

verifying the manifest signature using the live-stream public key, thereby producing a reference hash value for the portion of the media content; and comparing the reference hash value for the portion of the media content and the verification hash value for the portion of the media content.

14. The computer system of claim 11, wherein the multiple portions of the media content are part of a hierarchical temporal organization of portions having multiple temporal hierarchy levels, and wherein the operations further comprise:

selecting one of the multiple temporal hierarchy levels for the verifying the portions, respectively, of the media content, thereby selecting a point of balance between provenance latency and playback performance, wherein the verifying the respective portions of the media content is performed for the respective portions at the selected temporal hierarchy level.

15. The computer system of claim 11, wherein the multiple portions of the media content are part of a hierarchical temporal organization of portions having multiple temporal hierarchy levels, and wherein the operations further comprise:

selecting two or more of the multiple temporal hierarchy levels for the verifying the portions, respectively, of the media content, the multiple portions of the media content including level-specific portions that overlap between the multiple temporal hierarchy levels, wherein the verifying the respective portions includes verifying the level-specific portions at each of the selected two or more of the multiple temporal hierarchy levels.

16. The computer system of claim 11, wherein the manifest metadata further includes an indicator of a validity period, and wherein the indicator of the validity period specifies an end time after which the provenance of the media content is no longer asserted.

17. The computer system of claim 11, wherein the manifest metadata is signaled, in the bitstream, as part of an object of the bitstream, the object including:

a field designating type of the object, the type specifying the object includes the manifest metadata;

the live-stream public key; and an indicator of a validity period.

18. The computer system of claim 17, wherein the manifest metadata lacks any signature based on a hash value for any of the media content, and wherein the manifest metadata is static for the validity period.

19. The computer system of claim 11, wherein the portion signature is signaled, in the bitstream, as part of an object of the bitstream, the object including:

a field designating type of the object, the type specifying the object includes the portion signature; and the portion signature.

20. A non-transitory computer-readable medium having stored thereon computer-executable instructions for causing a processing system, when programmed thereby, to perform operations comprising:

receiving a first manifest signature and first manifest metadata, the first manifest metadata comprising a first live-stream public key;

verifying, with a long-term public key and the first manifest signature, the first manifest metadata;

determining a key pair comprising a live-stream private key and a second live-stream public key;

signing, with a long-term private key, second manifest metadata comprising the second live-stream public key, thereby producing a second manifest signature;

outputting the second manifest metadata and the second manifest signature; and for each of multiple portions of media content during live streaming of the media content:

receiving a first portion signature for the portion of the media content;

verifying, with the first live-stream public key and the first portion signature, the portion of the media content, thereby validating a first provenance claim for the portion of the media content;

signing, with the live-stream private key, the portion of the media content, thereby producing a second portion signature for the portion of the media content, the second portion signature providing a second provenance claim for the portion of the media content; and outputting the second portion signature for the portion of the media content.

\* \* \* \* \*